United States Patent
Wotton

[19]

[11] Patent Number: 6,138,402
[45] Date of Patent: Oct. 31, 2000

[54] DECORATIVE INSECT TRAP

[75] Inventor: Michael C. Wotton, Plantsville, Conn.

[73] Assignee: Sun Hill Industries, Stamford, Conn.

[21] Appl. No.: 09/078,045

[22] Filed: May 13, 1998

[51] Int. Cl.[7] .................................................. A01M 1/10
[52] U.S. Cl. .............................. 43/122; 43/107; D22/122
[58] Field of Search ...................... 43/107, 122; D22/122

[56] References Cited

U.S. PATENT DOCUMENTS

| D. 211,339 | 6/1968 | Callahan, Jr. | D22/19 |
|---|---|---|---|
| D. 212,221 | 9/1968 | Callahan, Jr. | D22/19 |
| 1,715,958 | 6/1929 | Strand | 43/122 |
| 1,772,729 | 8/1930 | Pisani | 43/122 |
| 4,476,647 | 10/1984 | Hall, Jr. | 43/122 |
| 4,551,941 | 11/1985 | Schneidmiller | 43/107 |
| 4,592,163 | 6/1986 | Wilson | 43/122 |
| 5,243,781 | 9/1993 | Carter | 43/122 |
| 5,274,949 | 1/1994 | Beaton | 43/113 |
| 5,309,668 | 5/1994 | Barton | 43/121 |
| 5,339,563 | 8/1994 | Job | 43/122 |
| 5,522,171 | 6/1996 | Mandeville | 43/107 |
| 5,557,880 | 9/1996 | Schneidmiller | 43/122 |
| 5,622,001 | 4/1997 | Kazmierzak | 43/121 |
| 5,718,078 | 2/1998 | Therrien | 43/121 |

*Primary Examiner*—Kurt Rowan
*Attorney, Agent, or Firm*—David P. Gordon; David S. Jacobson; Thomas A. Gallagher

[57] ABSTRACT

An insect trap includes a decorative cover, a container, and a funnel. The cover is preferably shaped in the form of a fanciful character and has a insect entry, a container opening, and a central window. The container has a mouth and is preferably an empty conventional two-liter plastic beverage bottle. The funnel has a flared opening and a short tubular extension at its other end. The extension of the funnel extends into the container and the flared opening seats against the mouth of the container. Bait, preferably tailored to lure particular species of flying insects, is provided in the container. The container is receivable through the container opening of the cover such that the mouth of the container is preferably aligned with the insect entry of the cover. Insects are lured by the bait and enter through the relatively wide flared opening of the funnel and into the container. Once inside the container the insects become confused by light entering the container through the window and are unable to navigate an exit path through the small opening presented by the extension of the funnel. A kit including the cover and the funnel is also provided. The insect trap presents a decorative appearance which can be used within and outside the home, is designed to use relatively safe baits, and can be re-used without cleaning by having a user supply additional containers for the invention.

17 Claims, 6 Drawing Sheets

DECORATIVE INSECT TRAP

BACKGROUND OF THE INVENTION

1. Field of the Invention

This invention relates broadly to traps. More particularly, this invention relates to insect traps for catching and killing flying insects.

2. State of the Art

It has long been known that insects, and particularly flying insects, can be harmful to people since they carry various pathogenic germs and viruses. In addition, flying insects can also be annoying pests which people often desire to eliminate from certain areas, especially around their home.

A number of insect traps are known for capturing and/or killing flying insects. For example, paper with an adhesive coating thereon (fly paper) can be suspended or laid flat on a surface so as to cause a flying insect to land on the paper and become caught in the adhesive coating. The paper is then discarded. Other traps use containment chambers with a passage-way into the chamber which insects can only traverse to enter the chamber but not to exit the chamber. Insects are lured into the chamber with a bait. While such traps can be effective, they have a drawback in that they are unsightly and detract from the living space of the home in or around which they are placed. In addition, these types of traps are often not intended to be discarded and must periodically be cleaned; i.e., the dead insects must manually be removed from the chamber of the trap. Moreover, the bait for containment-type traps often contain pesticides which, while able to kill flying insects, can be harmful to people and domestic animals.

SUMMARY OF THE INVENTION

It is therefore an object of the invention to provide a decorative insect trap.

It is another object of the invention to provide an insect trap which can be re-used without cleaning.

It is also an object of the invention to provide an insect trap which uses a relatively safe bait.

In accord with these objects, which will be discussed in detail below, an insect trap is provided which includes a cover, a container, and a funnel. The cover has an insect entry, a container opening, and a central window. Moreover, the cover is preferably decorative in design having the form of a fanciful character such as a frog. The container has a mouth which is shaded by the head of the fanciful character, and is preferably a clear two-liter plastic bottle. The funnel has a flared opening and a short tubular extension at its other end which is also shaded by the insect entry. The extension of the funnel extends into the container and the flared opening seats against the mouth of the container. Bait is provided in the container.

The container is receivable through the container opening of the cover such that the mouth of the container is preferably vertically aligned with the insect entry of the cover. Ambient light is able to travel from outside the trap through the window and into the container.

The bait for the trap can be tailored to lure a particular species of flying insect. Nevertheless, regardless of the type of insect which is desired to be trapped, it is preferable that the bait be relatively benign to humans and domesticated animals.

In use, the chosen bait is provided into the container, the funnel is placed into the mouth of the container, and the container is placed into the cover through the container opening. Insects lured by the smell of the bait, enter the insect entry of the cover, further enter through the relatively wide flared opening of the funnel, and pass through the shaded mouth of the container. The insects are attracted by the light entering through the window of the cover and into the container, associate the light with an exit and become confused and unable to find the true exit path through the small shaded opening presented by the extension of the funnel and mouth of the container. The insect trap, in use, provides the appearance that the fanciful character is eating the insects. The trapped insects, which eventually die, are at least partially hidden from view by the attractive cover.

It will be appreciated that when it is desired to change the bait and discard the trapped insects, the container can be removed through the container opening of the cover and discarded. Then another container can be used in place of the discarded container.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
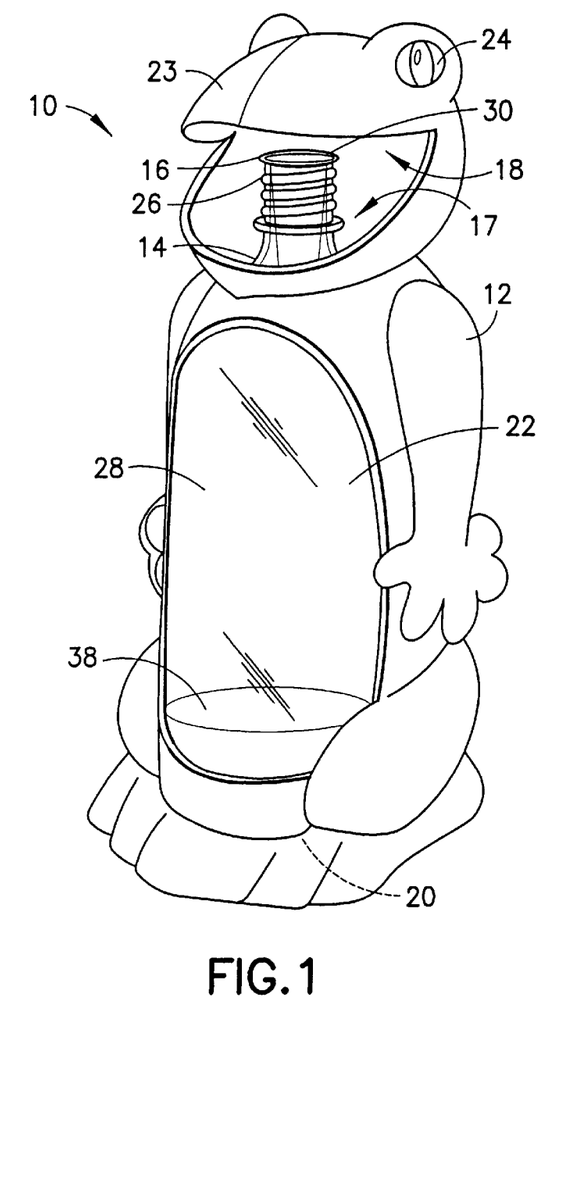
FIG. 1 is a perspective view of an insect trap according to the invention.

Turning now to FIG. 1, an insect trap 10 according to the invention is shown. The insect trap 10 includes a cover 12, a container 14, and a funnel 16. More particularly, the cover 12 has an interior 17, a preferably laterally opening insect entry 18, a container opening 20, and a central window 22, each of which provides access into the interior 17. Moreover, the cover 12 is preferably decorative in design, having the shape, coloration, and other indications, e.g., a head 23 and plastic molded eyes 24 glued in position, of a fanciful character such as a frog. In the preferred embodiment, the insect entry 18 preferably forms the mouth of the frog character, and the window 22 is preferably provided at a stomach location of the frog character. The insect entry 18 is preferably shaded by the head 23 or other upper portion of the cover.

The container 14 is provided with a mouth 26 and includes a space 28 into which bait 38, described below, is placed and in which the insects are trapped. The container is also preferably transparent or translucent. The container 14 preferably is an empty conventional clear two-liter plastic bottle; e.g., the type of bottle in which carbonated beverages are often sold.

Figure 2:
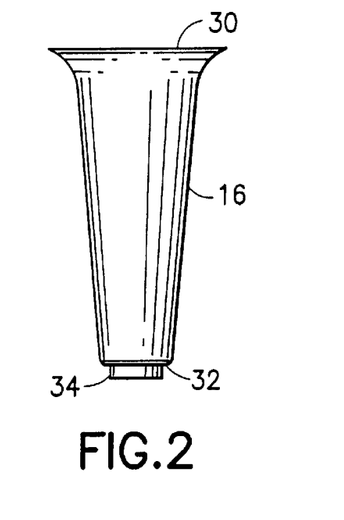
FIG. 2 is a side elevation view of the funnel used in the insect trap shown in FIG. 1.
Figure 3:
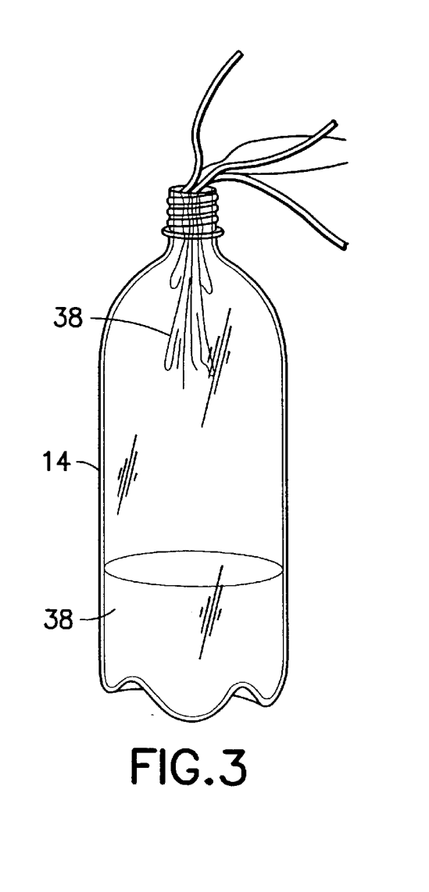
FIGS. 3–5 illustrate the method of the using of the insect trap according to the invention.
Figure 4:
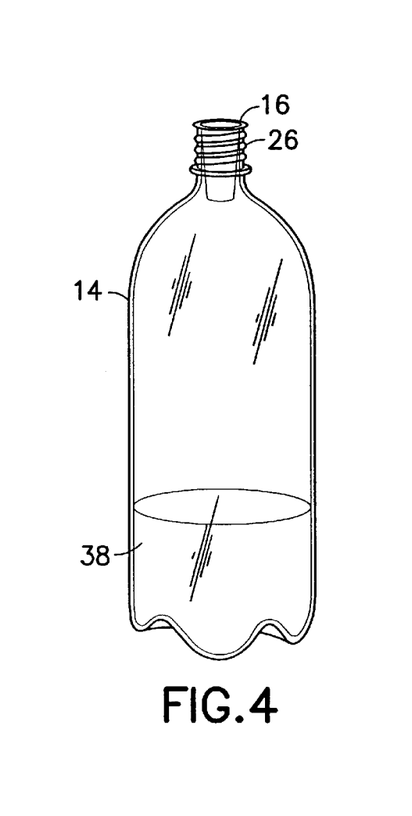
Figure 5:
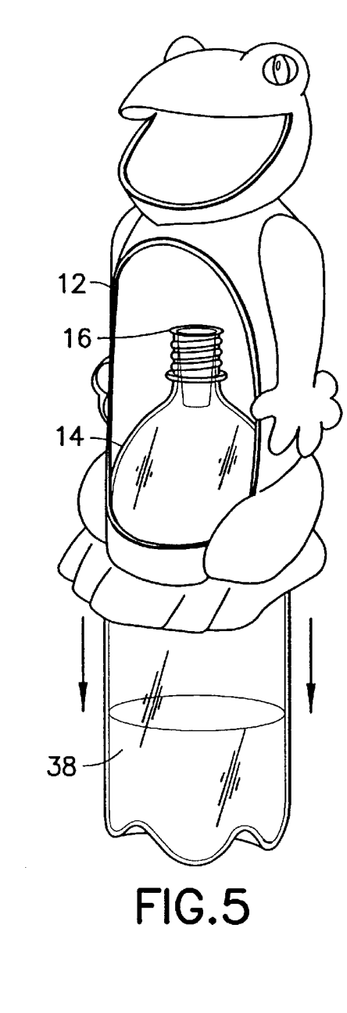

Referring to FIGS. 1 and 2, the funnel 16 has a flared opening 30 and, at its other end 32, a short constricted tubular extension 34. The funnel 16 is positioned such that the extension 34 extends into the container 14 and the flared opening 30 seats against the mouth 26 of the container.

Referring back to FIG. 1, the container 14 is receivable into the interior 17 of the cover 12 through the container opening 20 of the cover such that the container is preferably held substantially upright by the cover. Thus, the cover 14 is preferably formed with an interior cavity which is sized to fit and hold a two-liter plastic bottle, preferably touching the bottle in a plurality of locations. It is also preferable that the mouth 26 of the container 14 be substantially vertically aligned with the insect entry 18, yet shaded by the head 23 or other upper portion of the cover 12 when the container is held within the cover. Furthermore, the laterally located insect entry 18 shields the mouth 26 of the container and the funnel 16 from rain which may fall on the insect trap 10 when the trap is used outdoors. The central window 22 permits the contents of the container 14, e.g., the bait and trapped insects, to be viewed therethrough. More importantly, the central window 22 permits light to enter the container at a location away from the mouth (exit) of the container. In addition, when the central window 22 is provided at a stomach location, trapped insects viewed from outside the trap 10 create the appearance that the fanciful character (e.g., the frog) has eaten the insects. Furthermore, the cover 12 hides the unattractive container 14 from view of the user of the insect trap, providing the trap with an acceptable appearance for placement around the user's home.

In the preferred embodiment of FIGS. 1–5, the cover 12 is preferably approximately fifteen inches in height and six inches in width, has an insect entry 18 which is preferably approximately two and a half inches in height and four and a half inches in width (a central location of the insect entry being located approximately eleven and a half inches from the bottom of the cover), the container opening 20 is preferably approximately five inches by four inches, and the window 22 is preferably approximately six inches in height and four inches in width. The funnel 16 is preferably approximately two and a quarter inches in length, one inch across the flared opening 30, and five-sixteenths across the extension 34.

The bait 38 for the trap can be tailored toward a particular species of flying insect. For example, for luring house flies, the bait can be any combination or one of scraps of raw fish preferably at least partially immersed in water, uncooked beef preferably at least partially immersed in water, and dead flies. For luring yellow jackets, a liquid bait of any of lemonade, grenadine, fruit flavored carbonated water, fruit juices, beer, or sugar water, in combination or alone, can be used. Preferably, enough liquid bait is used to provide at least a one inch level of liquid bait in the container 14. For luring fruit flies, bananas, bread soaked in beer or lemonade, and/or apple slices can be used. Other baits and amounts of bait for these and other types of insects can, of course, be used. Nevertheless, regardless of the type of insect which is desired to be trapped, it is preferable that the bait be relatively benign to humans and domesticated animals.

Turning now to FIGS. 1 and 3 through 5, in use, the bait 38 is provided into the space 28 of the container 14 (FIG. 3), the funnel 16 is placed into the mouth 26 of the container 14 (FIG. 4), and the container 14 is placed within the cover 12 (FIG. 5) such that the mouth of the container 26 and the funnel 16 are shaded by the head 23 or other upper portion of the cover (FIG. 1). Referring particularly to FIG. 1, insects are lured by the scent of the bait 38, enter the insect entry 18 of the cover 12, and pass easily through the relatively wide flared opening 30 of the funnel 16, past the constricted extension 34, and into the space 28 of the container 14. Once inside the container 14 the insects are attracted to light entering the container 14 through the window 22 of the cover, and cannot see the exit path (funnel 16 and mouth 26) hidden in the shade of the head 23 or other upper portion of the cover. As a result, the insects become confused and are unable to navigate the exit path through the relatively small opening presented by the extension 34 of the funnel 16. Where the bait 38 includes a liquid, the insects will eventually drown in the bait; otherwise, the insects remain simply trapped. The insect trap 10 maintains an attractive appearance even after containing dead insects, as the cover 12 (e.g., the frog body) at least partially hides from sight insects trapped and killed within the insect trap 10.

It will be appreciated that when it is desired to change the bait or discard the trapped insects, the container 14 is preferably capped and discarded. Then another like container can be used in place of the discarded container.

Figure 6:
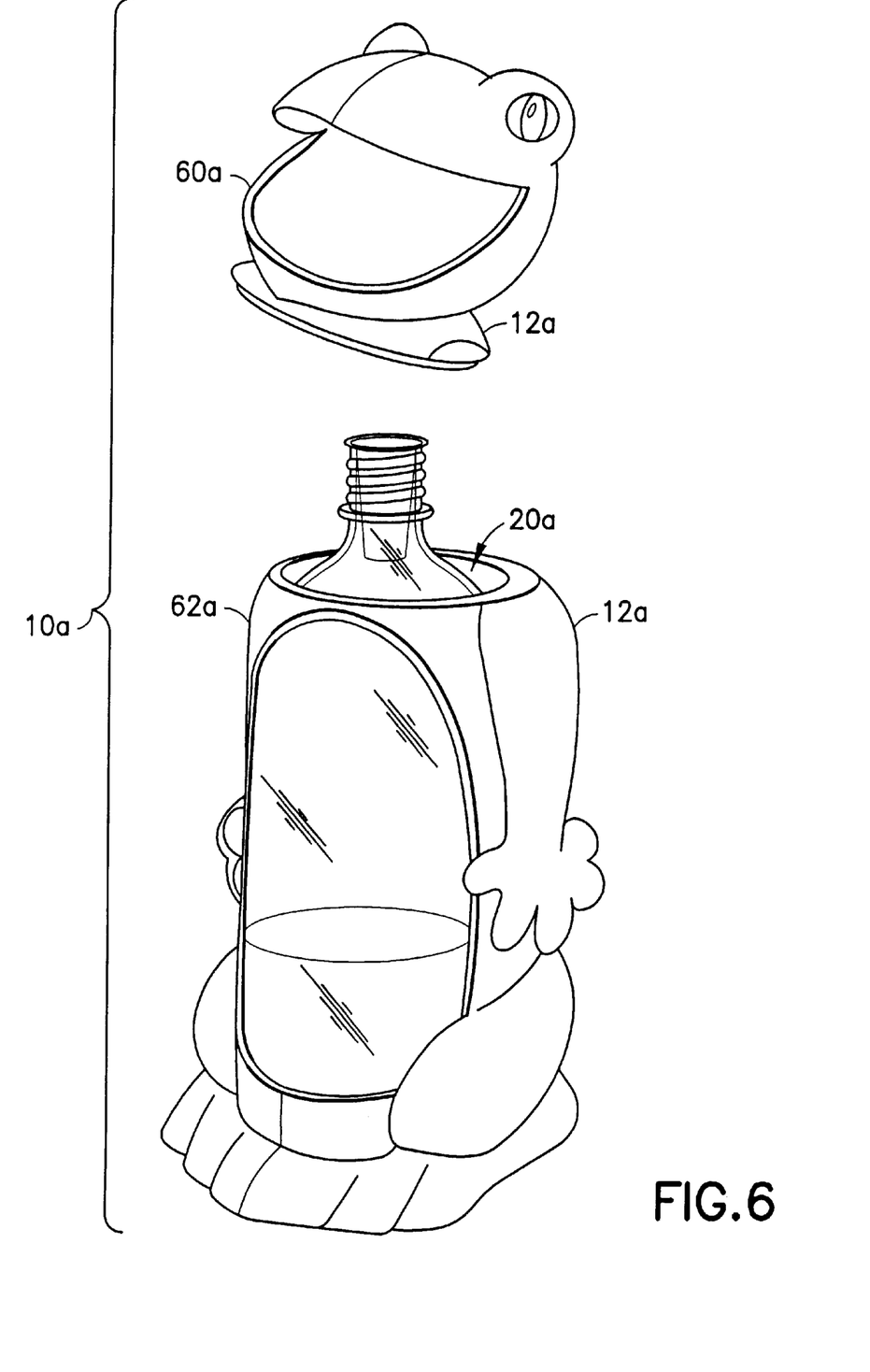
FIG. 6 illustrates a first alternate cover for the insect trap according to the invention.

Turning now to FIG. 6 a first alternate embodiment of the cover 12a of the invention 10a is shown. The cover 12a includes two parts 60a, 62a, e.g., a head part 60a and a body part 62a, which may be displaced relative to each other. The parts 60a, 62a may be completely uncouplable (as shown) or hingedly coupled such that the one part can move relative to the other part (not shown). If desired, latches or interference fits can be used for joining the parts. Regardless, one part can be moved relative to the other part in order to provide access into the interior of the cover; i.e., to define a container opening 20a.

Figure 7:
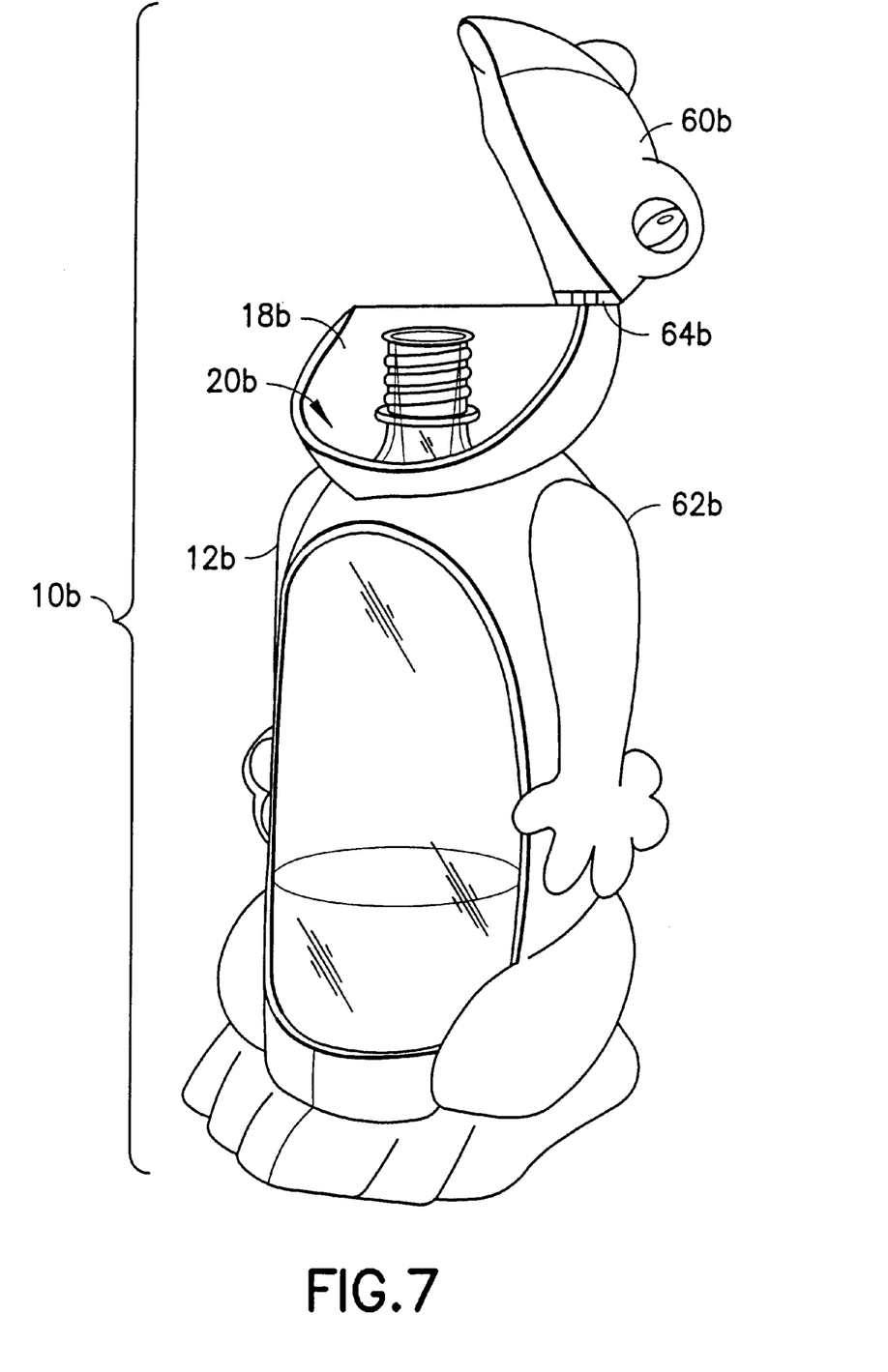
FIG. 7 illustrates a second alternate cover for the insect trap according to the invention.

Turning now to FIG. 7, a second alternate embodiment of the cover 12b of the invention 10b is shown. The cover 12b includes two parts 60b, 62b, e.g., a top head part 60b and a lower head and body part 62b, which may be displaced relative to each other. The parts 60b, 62b may be completely uncouplable (not shown) or coupled by a hinge 64b such that the one part can move relative to the other part. In either case, one part can be moved relative to the other part to define both the insect entry 18b and the container opening 20b.

Figure 8:
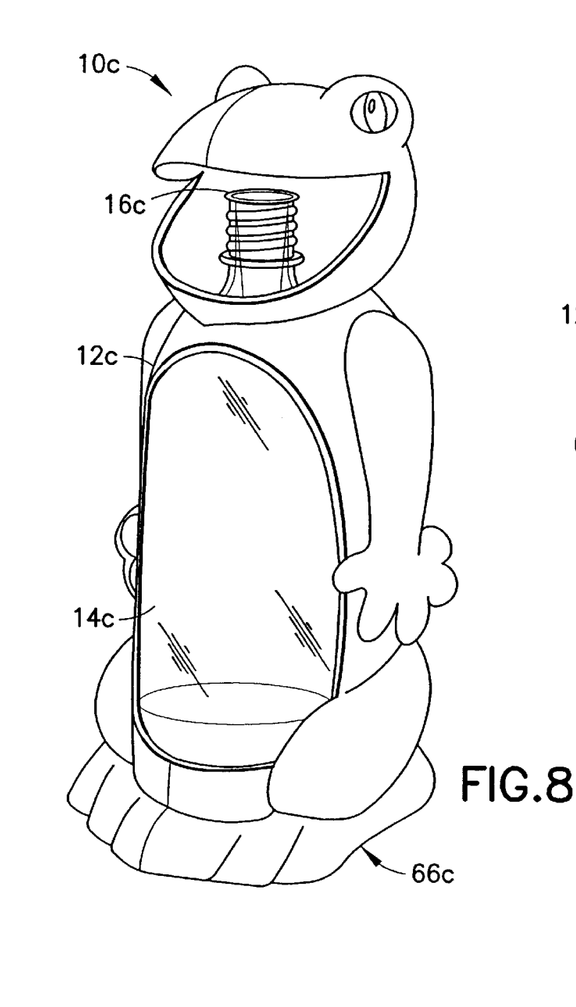
FIG. 8 illustrates a front perspective view of a third embodiment of the cover for the insect trap according to the invention
Figures 9, 10:
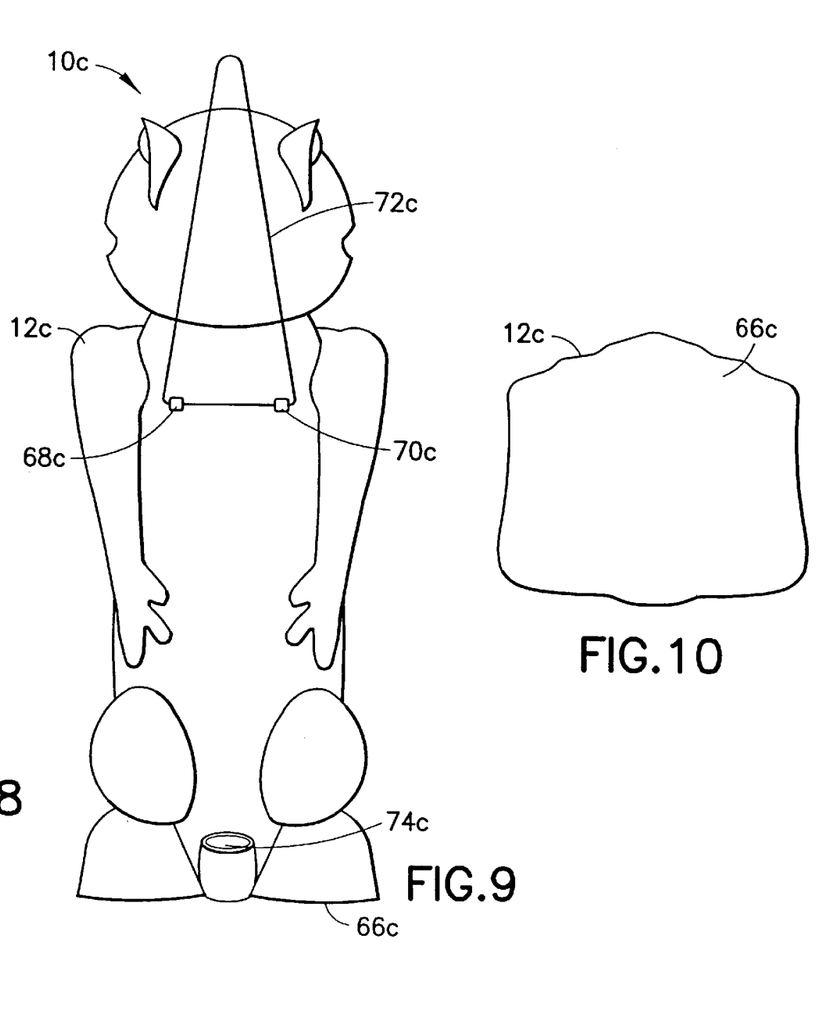
FIG. 9 illustrates a back view of the third embodiment of the cover shown in FIG. 8.
FIG. 10 illustrates a bottom view of the third embodiment of the cover shown in FIG. 8.

Turning now to FIGS. 8–10, a third embodiment of the cover 12c of the invention 10c is shown. The cover 12c includes a solid bottom 66c and an upper opening (not shown) for receiving the container 14c, preferably according to either the first and second alternate covers described above. The back of the cover 12c is preferably molded with hooks 68c, 70c, and a wire 72c coupled to the hooks permits suspension of the insect trap 10c, e.g., from a tree. Alternately, other types of suspension means can be used. In addition, the cover 12c is provided with a holder 74c, preferably at the back of the cover, which can store a cap for the container 14c, or alternatively can store the funnel 16c when the insect trap 10c is not in use. Alternately, the holder 74c can be provided to the interior of the cover 12c of the insect trap.

Figure 11:
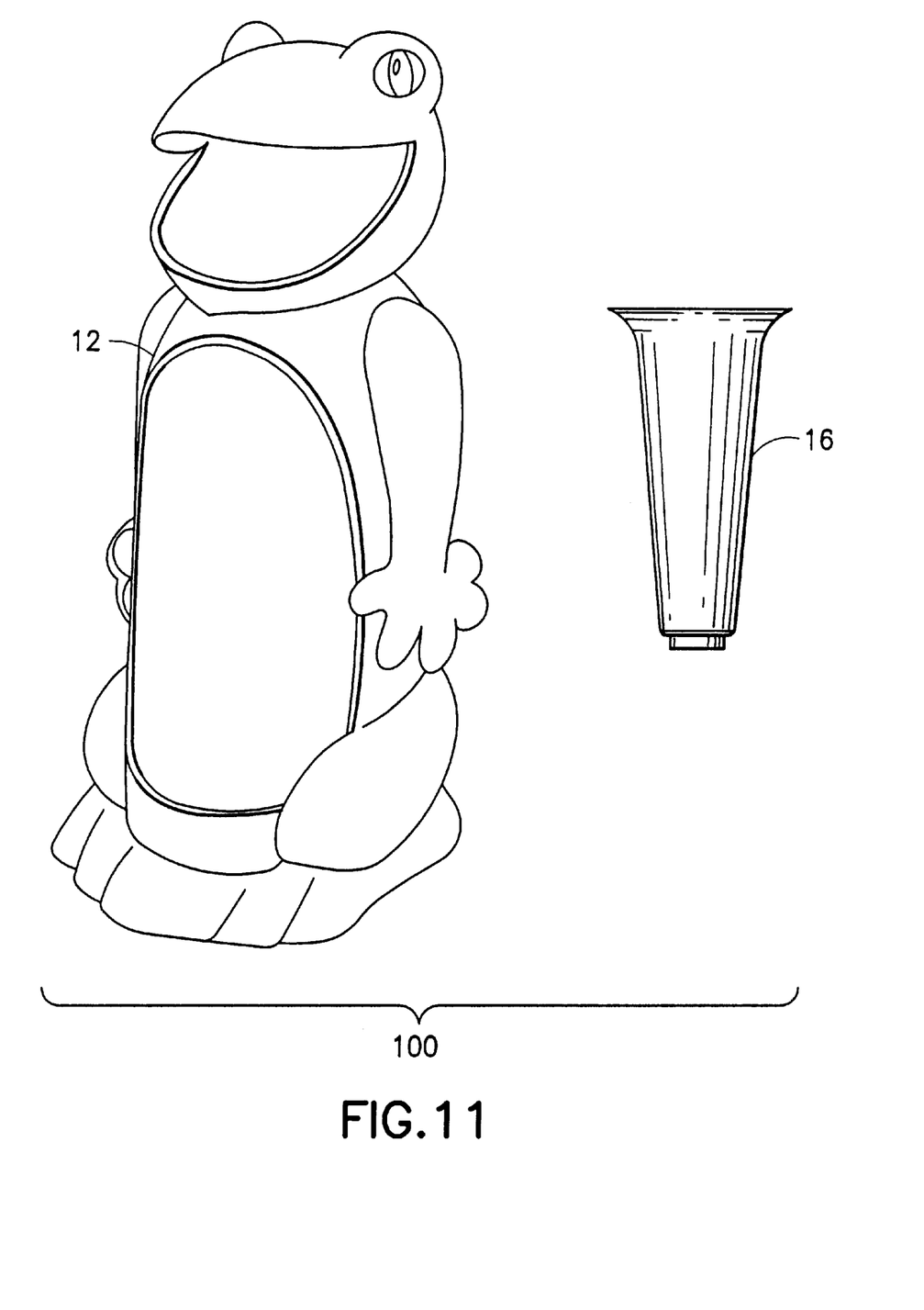
FIG. 11 is a perspective view of a kit for an insect trap according to the invention.

Turning now to FIG. 11, it will also be appreciated that because of the preferred design of the container (a conventional two-liter plastic beverage bottle which can easily be supplied by a user of the insect trap), the insect trap of the invention may be provided in a kit 100 which does not include the container of the invention, but which does include the decorative cover 12 (or 12a or 12b) and the funnel 16.

The insect trap of the invention thereby provides an effective trap for flying insects while presenting a decorative appearance which can be used within and outside the home. Moreover, the insect trap is designed to use relatively safe baits which do not present an unnecessary harm to people and domesticated animals. Furthermore, the device can be re-used without cleaning by having a user supply the container element of the invention.

There have been described and illustrated herein a decorative insect trap and method of using the same. While particular embodiments of the invention have been described, it is not intended that the invention be limited thereto, as it is intended that the invention be as broad in scope as the art will allow and that the specification be read likewise. Thus, while a particular decorative cover has been described and shown in the drawings; i.e., that of a fanciful frog character, it will be appreciated that other decorative covers including fanciful characters of both flora and fauna can also be provided. Also, while the cover has been shown to hold the container such that mouth of the container in a vertical position, it will be appreciated that the cover may be designed to hold the container at an angle other than vertical. Furthermore while particular types of bait have been disclosed, it will be understood other baits can likewise be used. Also, while a conventional two-liter bottle is preferred for the container, it will be recognized that other containers can also be used. Moreover, while a particular funnel has been disclosed, it will be appreciated that other funnel-type devices could be used as well, provided that the device permits flying insects easy access into the container and substantially prevents the exit of the insects. In addition, while one embodiment of the cover includes holding means for holding at least one of the funnel and a cap for the container, it will be appreciated that any of the described covers may include a holding means. It will therefore be appreciated by those skilled in the art that yet other modifications could be made to the provided invention without deviating from its spirit and scope as so claimed.

What is claimed is:

1. An insect trap for trapping insects, comprising:

a) a container having a mouth and defining a container interior;

b) a cover defining a cover interior and a first opening through which said container is received into said cover interior, said cover shaped like a fanciful character provided with a face having a mouth opening which defines a path to said mouth of said container; and c) a funnel means positioned in said mouth for creating a substantially one way passage for the insects into said container.

2. An insect trap according to claim 1, wherein:

said cover holds said container in a substantially upright position.

3. An insect trap according to claim 1, wherein:

said cover includes a second opening which is substantially aligned with said mouth of said container.

4. An insect trap according to claim 1, wherein:

said cover is comprised of a first part and a second part displaceable relative to said first part.

5. An insect trap according to claim 1, wherein:

said container is a two-liter plastic bottle.

6. An insect trap for trapping insects, comprising:

a) a container having a mouth and defining a container interior;

b) a cover defining a cover interior, a first opening through which said container is substantially completely received into said cover interior, another opening which permits light to pass through the cover and into said container, and means for shading said mouth of said container; and c) a funnel means positioned in said mouth for creating a substantially one way passage for the insects into said container.

7. An insect trap kit for trapping insects for use with a container having a mouth and a container interior provided with a bait, said kit comprising:

a) a cover defining a cover interior and a first opening through which the container is receivable into said cover interior, said cover shaped like a fanciful character provided with a face having a mouth opening; and b) funnel means positionable within the mouth of the container, wherein when the container is received within said cover interior, said mouth opening defines a path into the mouth of the container and said funnel means creates a substantially one way passage for insects into the container.

8. An insect trap kit according to claim 7, wherein:

said cover includes a second opening which is aligned with the mouth of the container when the container is provided in said cover interior.

9. An insect trap kit according to claim 7, wherein:

said cover is comprised of a first part and a second part displaceable relative to said first part.

10. An insect trap kit according to claim 9, wherein:

said first part and said second part are coupled by a hinge.

11. An insect trap kit according to claim 7, wherein:

said cover is provided with a bottom portion and means for hanging said insect trap.

12. An insect trap kit according to claim 7, wherein:

said cover includes holder means for holding at least one of said funnel and a cap for the container.

13. An insect trap kit according to claim 7, wherein:

said funnel means includes a first flared end and a second end which includes a constricted tubular portion, said first flared end seatable against the mouth of the container.

14. An insect trap kit according to claim 7, wherein:

said first opening is sized to receive a standard two-liter beverage bottle.

15. An insect trap kit for trapping insects for use with a container having a mouth and a container interior provided with a bait, said kit comprising:

a) a decorative cover having a substantially continuous surface defining a cover interior, a first opening through which the container is receivable into said cover interior, and another opening, and means for shading the mouth of the container, said cover adapted to hold the container in a substantially upright position; and b) funnel means positionable within the mouth of the container, wherein when the container is received within said cover interior, said another opening permits light to pass through the cover and into the container and said funnel means creates a substantially one way passage for insects into the container.

16. An insect trap for trapping insects, comprising:
a) a substantially transparent or translucent container having a mouth and defining a container interior;
b) a decorative cover having a shape of a fanciful character and defining a cover interior, a first opening through which said container is received into said cover interior, a second opening which permits light to pass through the cover and into said container, and means for shading said mouth of said container; and
c) a funnel means positioned in said mouth for creating a substantially one way passage for the insects into said container,
wherein said cover holds said container in a substantially upright position.

17. A method for trapping insects, comprising:
a) providing a container having a mouth and defining an interior;
b) placing a bait into the container interior;
c) positioning a funnel means in said mouth to create a substantially one way passage for the insects into the container, said funnel having a smaller end which is positioned below a larger end; and
d) placing a cover over the container, the cover defining an access opening to permit insects to access the funnel means, a light opening below said access opening which permits light to pass through the cover and into the container, and means for shading the mouth of the container above said light opening.

* * * * *